United States Patent [19] | [11] 4,258,370
Paranjpe | [45] Mar. 24, 1981

[54] JET DROP PRINTER

[75] Inventor: Suresh C. Paranjpe, Xenia, Ohio

[73] Assignee: The Mead Corporation, Dayton, Ohio

[21] Appl. No.: 36,214

[22] Filed: May 4, 1979

[51] Int. Cl.³ ........ G01D 15/18

[52] U.S. Cl. ........ 346/75

[58] Field of Search ........ 346/75

[56] References Cited

U.S. PATENT DOCUMENTS

| | | | |
|---|---|---|---|
| 3,136,594 | 6/1964 | Ascoli | 346/75 X |
| 3,298,030 | 1/1967 | Lewis | 346/75 |
| 3,596,276 | 7/1971 | Lovelady | 346/75 X |
| 3,641,588 | 2/1972 | Metz | 346/75 |
| 3,656,174 | 4/1972 | Robertson | 346/75 |
| 3,739,395 | 6/1973 | King | 346/75 |
| 3,871,004 | 3/1975 | Rittberg | 346/75 |
| 3,916,421 | 10/1975 | Hertz | 346/75 |
| 3,972,052 | 7/1976 | Atumi | 346/75 X |
| 4,010,477 | 3/1977 | Frey | 346/75 |
| 4,085,409 | 4/1978 | Paranjpe | 346/75 |
| 4,091,390 | 5/1978 | Smith | 346/75 |
| 4,122,458 | 10/1978 | Paranjpe | 346/75 |
| 4,123,760 | 10/1978 | Hou | 346/75 |

FOREIGN PATENT DOCUMENTS 2713512 10/1977 Fed. Rep. of Germany .

OTHER PUBLICATIONS

Gamblin et al, Orthogonalization of Electrostatic Printing, IBM Tech. Disc. Bulletin, vol. 11, No. 10, Mar. 1969, pp. 1292–1293.

Gamblin et al, Electrostatic Ink Deflection Bar Code Printer, IBM Tech. Disc. Bulletin, vol. 11, No. 12, May 1969, pp. 1736–1737.

Krause, K. A.; Ink Jet Head, IBM Tech. Disc. Bulletin, vol. 19, No. 8, Jan. 1977, pp. 3216–3217.

Albrecht, D. W., Multinozzle Ink Jet Head with Common Bias, IBM Tech. Disc. Bulletin, vol. 20, No. 2, Jul. 1977 pp. 760–761.

*Primary Examiner*—Joseph W. Hartary
*Attorney, Agent, or Firm*—Biebel, French & Nauman

[57] ABSTRACT

A jet drop printer for selectively depositing drops along a plurality of parallel lines on a moving print receiving medium includes a print head for generating a plurality of jet drop streams directed toward the moving print receiving medium, with the streams arranged in a row substantially perpendicular to the direction of movement of the print receiving medium. A drop charging electrode arrangement, adjacent each of the jet drop streams, selectively charges drops in each of the streams to one of a plurality of discrete charge levels. A deflection means provides a plurality of static drop deflecting electrostatic fields, with each of the jet drop streams passing through an associated one of the fields. Each drop deflecting field deflects charged drops passing therethrough in a direction which is inclined with respect to the row of jet drop streams and with respect to the direction of movement of the print receiving medium. Each drop in the jet drop streams is deflected by a distance dependent upon the charge carried by the drop. A drop catcher means positioned adjacent the row of drop streams and extending substantially parallel thereto, catches drops from each of the drop streams which are sufficiently deflected. The deflection means may include a plurality of parallel lateral deflection electrodes for providing first static electrical deflection fields extending substantially parallel to the row of jet drop streams and a longitudinal deflection electrode for providing a second static electrical deflection field extending substantially perpendicular to the row of jet drop streams. Alternatively, the deflection means may comprise a plurality of pairs of parallel deflection electrodes extending obliquely with respect to the row of jet drop streams.

7 Claims, 7 Drawing Figures

JET DROP PRINTER

BACKGROUND OF THE INVENTION

The present invention relates to ink jet printers and, more particularly, to a multiple jet ink jet printer in which each jet deposits drops selectively along a plurality of parallel print lines on a moving print receiving medium.

A number of prior art multiple jet printers have provided for servicing a plurality of print positions on a print receiving medium with each of a plurality of jets. Such printers have generally been relatively complicated in structure, and many printers of this type have required cyclically varying drop deflecting fields for deflection of the drops to the multiple print positions. Such rapidly changing fields may be difficult to produce due to the difficulty in switching the relatively large potentials which are applied to the deflection field electrodes.

One such jet printer device is shown in U.s. Pat. No. 3,739,395, issued June 12, 1973, to King. The King printer generates a plurality of jets which are arranged in a row perpendicular to the direction of print web movement. Drops in the jets ae selectively charged on a binary basis. Two pairs of deflection electrodes, associated with each jet, generate deflection fields through which the drops in the jet pass. The uncharged jets pass through the fields in a straight trajectory to a catcher extending beneath the row of jets. The first deflection electrode pair provides a static electrical field which deflects the charged jet drops in a direction substantially perpendicular to the row of jets such that the charged drops do not strike the catcher. Thereafter, the charged drops pass through a field provided by the second pair of electrodes and are laterally deflected in a direction parallel to the row of jets such that they strike the print receiving web along one of a plurality of print lines on the web. This second pair of electrodes has a cyclically varying potential applied thereto, such that a cyclically varying electric field laterally deflects charged drops passing through the field to selected print positions.

U.S. Pat. No. 3,641,588, issued Feb. 8, 1972, to Metz, discloses an ink jet printer in which drops from a row of jet drop streams are selectively charged and the charged drops are deflected substantially perpendicular to the row such that they do not strike a catcher. The charged drops are thereafter laterally deflected generally parallel to the row of jet drop streams such that they strike a continuously moving print receiving medium at one of a plurality of laterally displaced print positions. In order to compensate for movement of the print receiving medium during lateral deflection of the drop streams to produce characters in a substantially square matrix, each pair of deflection electrodes is tilted slightly with resepct to the row of jets. Similarly, the drop catcher for each jet is correspondingly tilted.

U.S. Pat. No. 3,656,174, issued Apr. 11, 1972, to Robertson, discloses a printing device in which a plurality of jet streams from a set of orifices in an orifice plate are spaced apart along a closed contour in the orifice plate. Drops from the streams are selectively charged by application of an electrical signal to a conductive surface surrounding the streams adjacent the point at which the drops are formed. The conductive surface extends beneath the point of drop formation for production outwardly attractive forces on the charged drops. The drops are deflected outwardly for selective catching by an apertured catching plate. By modulating the charging signal, the drops from each jet may be deflected outwardly to selected print positions, thereby creating half-tone images on the print receiving medium below the apertured catched plate.

U.S. Pat. No. 4,123,760, issued Oct. 31, 1978, to Hou, discloses a jet drop recorder, including a plurality of pairs of deflection electrodes which are positioned on opposite sides of respective ones of a plurality of jet fluid filaments and offset with respect to the filaments. Drops formed from the end of each fluid filament are steered to different laterally separated printing positions by application of a cyclic differential electrical signal to the electrodes. This signal deflects the unbroken fluid filament, which in turn directs the drops toward the desired printing positions. No additional field is required since drops are directed to a catcher parallel to the row of jets by applying a signal simultaneously to both of the electrodes in each electrode pair.

U.S. Pat. No. 3,871,004, issued Mar. 11, 1975, to Rittberg, discloses a moving jet drop printer in which ejector nozzles are arranged in a row opposite the record carrier for ejection of the fluid drops by means of selectively excitable pressure generators. Deflection electrodes are positioned adjacent each nozzle and have cyclically varying deflection potentials placed there across in order to produce deflection of drops from each nozzle in a direction which is inclined with respect to the direction of movement of the printer. Each nozzle is therefore capable of servicing a number of print positions.

U.S. Pat. No. 3,596,276, issued July 27, 1971, to Lovelady et al, and IBM Techincal Disclosure Bulletin, Vol. 11, No. 10, March 1969, pp. 1292 and 1293, disclose single jet printers, utilizing a skewed pair of lateral deflection electrodes for generating an inclined static electrical deflection field. The jet drops are charged to varying levels and thereafter deflected by the deflection field. Skewing of the deflection field results in elimination of the skewed print pattern which would otherwise result from simultaneous printing and movement of the print receiving medium.

U.S. Pat. No. 3,298,030, issued Jan. 10, 1967, to Lewis et al, discloses a multiple jet ink jet printer in which the jet streams are positioned in a row perpendicular to the direction of movement of the print receiving medium and in which drops in ech jet are selectively charged to discrete charge levels. Thereafter, the charged drops are deflected to print positions on the print receiving medium by pairs of lateral deflection electrodes, one such pair being positioned adjacent each of the jet streams. The lateral deflection electrodes provide static deflection fields which extend generally in a direction perpendicular to the movement of the print receiving medium. Drops which are to be caught are charged sufficiently such that they are laterally deflected to catchers positioned between the jets and extending parallel to the direction of movement of the print receiving medium. Since a catcher structure is interposed between each of the adjacent jets in the Lewis et al printer, the printer is not capable of providing print coverage across the entire width of the print receiving medium.

U.S. Pat. No. 3,972,052, issued July 27, 1976, to Atumi et al, discloses printing apparatus in which drops from a single jet are selectively charged to a single charge level and thereafter deflected laterally and longitudinally by pairs of deflectin electrodes across which are impressed ramp-shaped deflection signals.

Several prior art ink jet printers include a row of jets which is inclined with respect to the direction of movement of a print receiving medium. While capable of providing printing of multiple print positions with each jet by deflection of drops in a direction perpendicular to the row, such printers generally require substantial reordering of input data. Relatively complicated print control circuitry will therefore generally be required.

U.S. Pat. No. 4,085,409, issued Apr. 18, 1978, to Paranjpe, discloses a jet printer having one or more rows of jets which are deflected in a direction perpendicular to the jet row or rows, such that the drops from each jet strike the print medium at a plurality of print positions. The row of jets is inclined with respect to the direction of movement of the print receiving medium. Drops in the streams are selectively charged to one of a number of discrete charge levels in order to cause the drops to be appropriately deflected by a static electrical field. Drops charged to a catch charge level are deflected by a static electrical field to a catcher which extends parallel to the row. IBM Technical Disclosure Bulletin, Vol. 20, No. 2, dated July 1977, pp. 760, 761, by D.W. Albrecht, discloses a printer similar in operation to the Paranjpe '409 printer.

U.S. Pat. No. 4,122,458, issued Oct. 24, 1978, to Paranjpe, discloses a similar printer arrangement in which drops from each jet pass successively through a plurality of variable deflection fields. Each of the deflection fields extends perpendicular to the row of jets and deflection may be controlled either by charging the jets to varying charge levels, or by altering one or more of the deflection fields in dependence upon the print position to which the drop is to be directed, or by using both techniques simultaneously.

U.S. Pat. No. 4,091,390, issued May 23, 1978, to Smith et al, discloses an ink jet printer in which a row of jet nozzles is inclined with respect to the direction of relative motion of a recording surface to permit selectively charged drops, charged to one of several charge levels, to be deflected by a single pair of electrostatic deflection plates common to all of the nozzles and parallel generally to the row of jets.

It may be seen, therefore, that prior art multiple jet printers, in which each jet services a number of print positions on the print receiving medium, are relatively complicated in structure. A need exists therefore for an ink jet printer of simple construction in which each of a plurality of jets services a number of print positions with the drops in each jet being directed to the respective print positions by means of static electrical fields.

Summary of the Invention

A multiple jet ink jet printer for depositing ink drops along parallel print lines on a moving print receiving medium, with drops from each jet drop stream being deposited along a plurality of the print lines, includes means for generating a plurality of jet drop streams directed at the print receiving medium with the streams being positioned in a row. A means is provided for selectively charging drops in each of the jet drop streams to one of a plurality of discrete electrical charge levels, with one of the charge levels being a catch level associated with catching of drops so charged, and each of the others of the charge levels being print levels associated with depositing of drops along respective ones of the print lines. A catcher means extends substantially parallel to the row of jet drop streams for catching drops which are not to be deposited upon the print receiving medium. A drop deflection means generates a plurality of parallel deflection fields, with each of the jet drop streams passing through an associated one of the deflection fields. Each of the deflection fields provides a net drop deflection of each drop passing therethrough directly related to the charge carried by the drop, the net deflection having a deflection component in a direction toward the drop catcher means and a deflection component parallel to said drop catcher means. The drops charged to the catch level are deflected to strike the drop catcher means and drops charged to one of the print levels are deflected to be deposited along the print lines associated therewith.

The deflection means may comprise a plurality of pairs of lateral deflection electrode means with each of the pairs positioned on opposite sides of a respective jet drop stream. Each of the plurality of pairs of lateral deflection electrode means provides a first static electrical deflection field extending substantially parallel to the row of jet drop streams. The deflection means further comprises a longitudinal deflection electrode means providing a second static electrical deflection field in a direction substantially perpendicular to the row of jet drop streams. Charged drops are deflected by the first static electrical deflectin field in a direction parallel to the row of jet drop streams and are defelcted thereafter by the second static electrical deflection field in a direction substantially perpendicular to the row of jet drop streams, such that the net deflection of each charged drop is inclined with respect to the row of jet drop streams.

Alternatively, the deflection means may comprise a plurality of pairs of parallel deflection electrodes extending obliquely with respect to the row of jet drop streams, each of the pairs being positioned on opposite sides of a respect jet drop stream. A deflection field is created by each pair of deflection electrodes for deflecting charged drops obliquely with respect to the row of jet drop streams.

Accordingly, it is an object of the present invention to provide a multiple jet ink jet printer in which a plurality of jet drop streams are positioned in a row with drops from each of the streams being deposited along a plurality of print lines on a moving print receiving medium; to provide such a printer in which a catcher extends along the row of jet drop streams; and to provide such a printer in which drops are selectively charged to one of a plurality of discrete charge levels and, thereafter, deflected in a direction oblique to the row of jet streams.

Other objects and advantages of the invention will be apparent from the following description, the accompanying drawings and the appended claims.

DETAILED DESCRIPTION OF THE PREFERRED EMBODIMENTS

Figure 1:
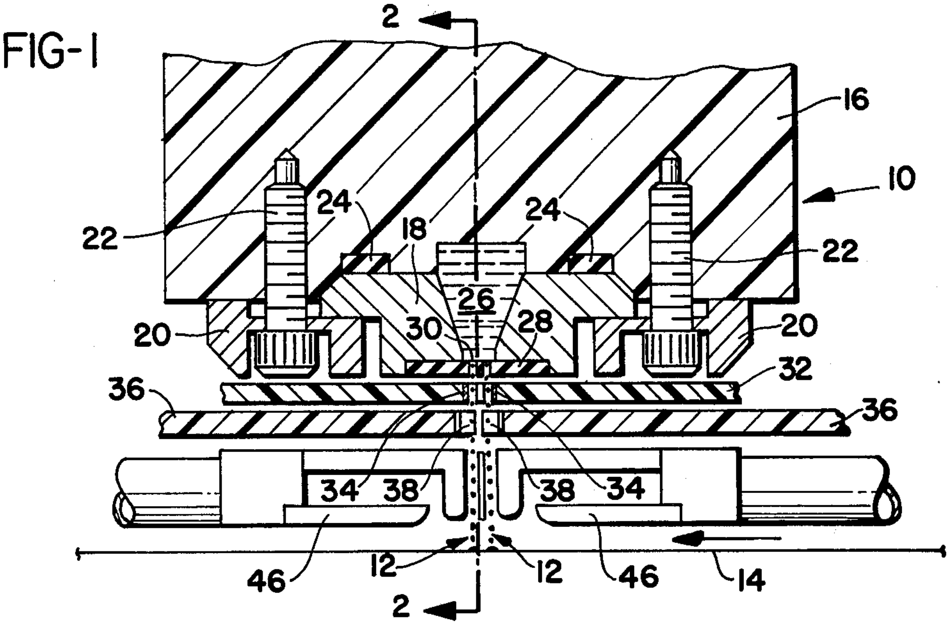
FIG. 1 is a sectional view of the ink jet printer of the present invention, taken in a plane generally perpendicular to the rows of jet drop streams.

Reference is now made to FIG. 1 which is a sectional view of the ink jet printer of the present invention. A print head means 10 is provided for generating a plurality of jet drop streams 12 directed toward a continuously moving print receiving medium 14, such as for example a paper web. The streams 12 are arranged in a pair of rows, extending generally perpendicular to the plane of the sectional view of FIG. 1 and these rows, in turn, are substantially perpendicular to the direction of movement of the print receiving medium 14. The print head means includes an upper assembly 16 and a lower assembly 18 which are held together by clamping bars 20, which extend the length of the print head means 10, and threaded bolts 22. Gasket 24 provides a fluid-tight seal between the upper assembly 16 and the lower assembly 18, which assemblies together form a fluid receiving manifold 26. An orifice plate 28 extends the length of the manifold 26 and defines a plurality of orifices 30 from which the fluid filaments emerge. Fluid drops periodically break off of the ends of these fluid filaments, thereby formingthe jet drop streams.

In order to increase the uniformity of drop size and the regularity of drop formation, any of a number of jet stimulation techniques may be used. One suchtechnique, as disclosed in U.S. Pat. No. 3,701,998, issued Oct. 31, 1972, to Mathis, is to provide mechanical stimulation to the orifice plate 28 at one end of the print head means 10, causing bending waves to travel the length of the orifice plate. These bending waves create pressure varicosities in the fluid filaments emerging from orifices 30, thus stimulating the formation of drops from the tips of the filaments.

Beneath orifice plate 28 is a charge electrode plate 32 which defines a plurality of openings which are aligned with orifices 30 and which are lined with conductive charge electrode rings 34. Electrical conductors, which may take the form of printed circuit conductors on the surface of charge electrode plate 32, are electrically connected to the charge electrode rings 34 and, provide a means for selectively applying charging signals to the charge electrode rings 34 to induce corresponding charging of drops to predetermined ones of a plurality of discrete charge levels.

A drop deflection means provides a plurality of static drop deflecting electrostatic fields with each of the drops in the jet drop streams 12 passing through an associated one of the fields. Each of the drop deflecting fields deflects charged drops passing therethrough in a direction which is inclined with respect to the row of jet drop streams 12 and with respect to the direction of movement of the print receiving medium. Since the drop deflecting electrostatic fields are static, each drop in the drop streams 12 is deflected by a distance which is directly related upon the charge carried by the drop.

Figure 2:
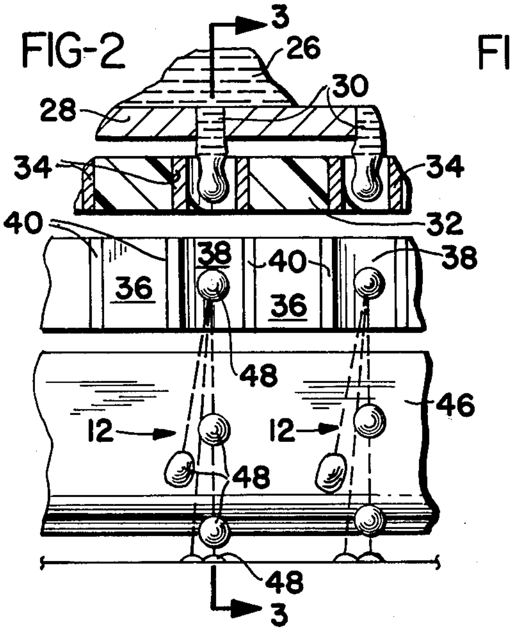
FIG. 2 is a partial enlarged sectional view taken generally along line 2–2 in FIG. 1.
Figure 3:
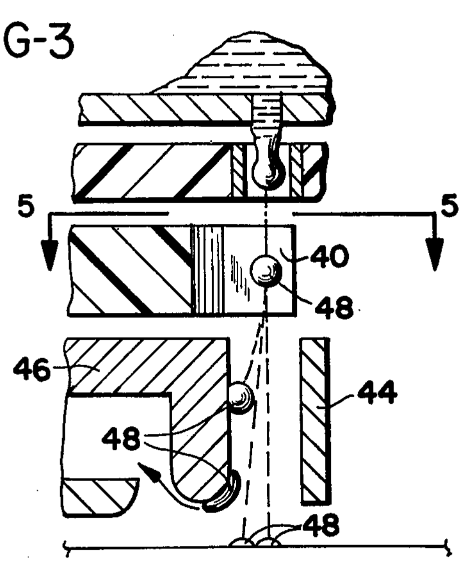
FIG. 3 is a sectional view taken generally along line 3–3 in FIG. 2.
Figure 4:
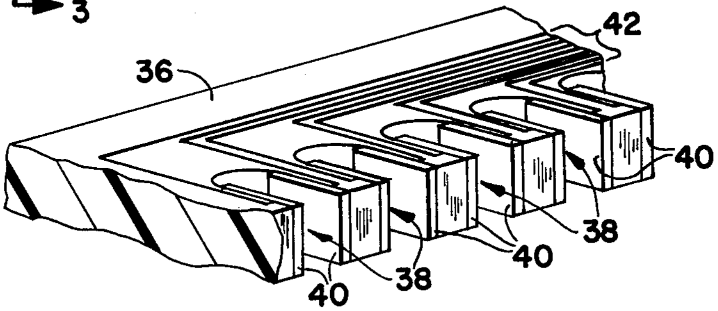
FIG. 4 is a perspective view of a portion of the deflection electrode arrangement of the printer of FIG. 1.

The drop deflection means, as seen more clearly in FIGS. 2–4, includes plates 36 having notches 38 defined therein which partially surround each of the jet drop streams 12. A plurality of pairs of lateral deflection electrode means 40 are positioned on opposite sides of respective jet drop streams 12 and provide first static electrical deflection fields extending substantially parallel to the row of jet drop streams 12. As seen in FIG. 4, conductors 42 which may be printed circuit conductors on the surface of plate 36, provide a means for connecting each pair of lateral deflection electrode means 40 to a DC electrical potential source, such that the desired deflection fields are generated across each of the pairs of electrode means 40.

The deflection means further includes a longitudinal deflection electrode means 44 upon which is impressed a substantial electrical deflection potential. Longitudinal deflection electrode means 44, in conjunction with grounded electrically conductive drop catcher means 46, provides a second static electrical deflection field in a direction substantially perpendicular to the row of jet drop streams 12.

As seen in FIG. 2, charged ones of drops 48 are deflected by the first static electrical deflection field created by lateral deflection electrode means 40 in a direction parallel to the row of jet drop streams. As seen in FIG. 3, charged ones of drops 48 are deflected thereafter by the second static electrical deflection field created by longitudinal deflection electrode means 44 and drop catcher means 46 in a direction substantially perpendicular to the row of jet drop streams. The net deflection of each charged drop, therefore, as it passes through the orthogonal electrostatic deflection fields is inclined with respect to the row of jet drop streams and with respect to the direction of movement of the print receiving medium 14. As seen in FIGS. 2 and 3, drops which are sufficiently deflected strike the catcher 46 and are thus prevented from striking the print receiving medium. Drops which strike the catcher 46 run down the catcher surface and are ingested into a partially evacuated cavity 49 within the catcher 46.

Figure 5:
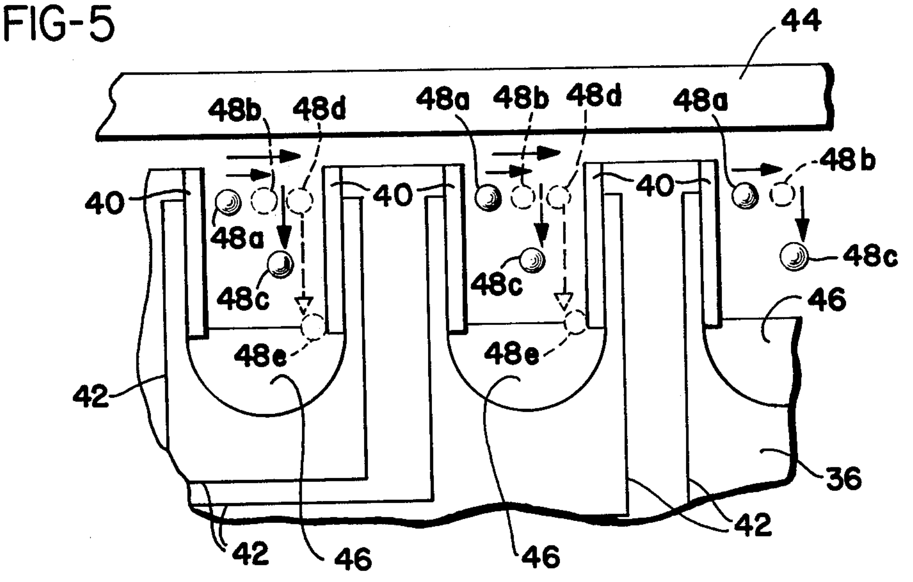
FIG. 5 is a view taken generally along line 5-5 in FIG. 3.

Reference is now made to FIG. 5, which illustrates further the manner in which the net drop deflection of charged drops occurs in a direction which is inclined with respect to the row of drops. FIG. 5 is a schematic representation of a drop deflection sequence as seen from above, looking down on the catcher 46, deflection plate 32, and deflection electrode 44. The deflection arrangement for only a single row of jet drop streams is illustrated, but it will be appreciated that a similar deflection arrangement is provided for the second row of jet drop streams. The streams in each row service print lines which interlace with the print lines serviced by the other row to provide uninterrupted printing coverage across the width of the print receiving medium. It will be further appreciated that, if desired, only a single row of jet drop streams need be utilized, providing the lateral spacing between adjacent jet drop streams is reduced.

Drops 48 are selectively charged to one of a plurality of discrete electrical charge levels prior to entering the orthogonal deflection fields. The greatest charge level is a catch level associated with catching of drops by catcher 46. Lesser charge levels are associated with depositing of drops along respective ones of the print lines on the print receiving medium 14. After drop formation and charging, the drops enter the first of the deflection fields, created by a potential difference between lateral deflection electrodes 40 positioned to each side of the jet drop streams. Drops entering the first deflection field do so at the position illustrated by drop 48*a*. Selected ones of the drops may carry no charge and such drops will, therefore, pass undeflected and strike the print receiving medium at a print position directly below drop position 48*a.*

If a drop, on the other hand, carries an intermediate charge level, it is deflected initially by the first deflection field to a laterally displaced position, illustrated as 48*b*. The amount of lateral deflection is directly related to the charge carried by the drop. This deflection distance is also a function of the drop mass, the magnitude of the lateral deflection field, and the time that it takes the drop to pass through the field. Since the last three factors remain substantially constant during operation of the printer, it will be appreciated that lateral deflection of the drops may be controlled by control of the discrete level of charge placed on the drops.

After passing through the first drop deflection field, the drops 48*b* enter the second drop deflection field which is created by an electrical potential difference between the longitudinal deflection electrode 44 and the drop catcher 46. This field extends generally perpendicular to the row of jet drop streams and, therefore, drops having been previously deflected to position 48*b* are deflected by the second drop deflection field to position 48*c.* The drops, so deflected, are thereafter deposited upon the print receiving medium at a print position generally below position 48*c.* Note that there is a lateral deflection between positions 48*b* and 48*c.* This deflection occurs as a result of the lateral velocity which is developed on the drops during their passage through the first drop deflection field, which velocity is maintained as the drops pass through the second field and strike the print receiving medium.

If the drop entering the first deflection field carries a higher, catch charge level, it is deflected laterally to the position shown at 48*d.* Thereafter, the drop is deflected by the second drop deflection field in a direction substantially perpendicular to the row of jet drop streams such that it strikes the catcher 46 at position 48*e.* Once again, the lateral velocity developed during passage through the first field continues to carry the drops laterally during their passage through the second field, thus causing a lateral spacing between positions 48*d* and 48*e.* Since, with the exception of the discrete charge level induced upon each drop, the factors determining the magnitude of drop deflection remain constant during operation of the printer, it will be appreciated that the ratio of lateral drop deflection to longitudinal drop deflection for each of the charged drops is substantially the same, regardless of the level of charge. This being so, it is clear that the print positions at which the drops emerge from the second deflection field and are deposited upon the medium 14 are all positioned along a line which is inclined with respect to the row of jet drop streams. Since the print positions fall along such an inclined line, it will be appreciated that the print control data determining charging of drops must be rearranged in order to produce the desired print image upon the medium 14.

Figure 6:
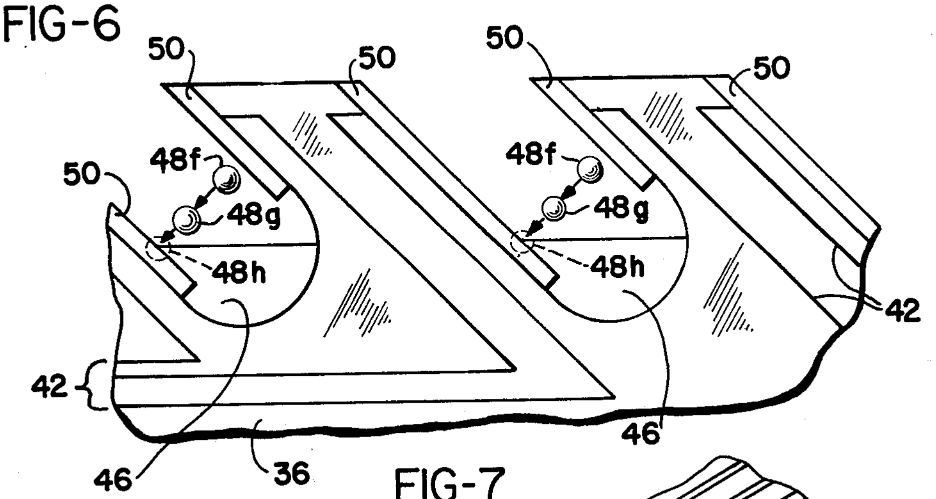
FIG. 6 is a view, similar to FIG. 5, showing a modified deflection electrode arrangement.
Figure 7:
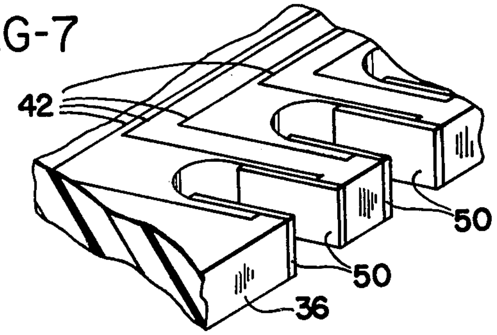
FIG. 7 is a partial perspective view of the deflection electrode arrangement of FIG. 6.

FIGS. 6 and 7 illustrate an alternative embodiment of the present invention in which the need for the longitudinal deflection electrode 44 is eliminated. With the exception of the elimination of electrode 44, and of the modification in the arrangement of the deflection plate 36 illustrated in the drawings, the printer of this embodiment is the same in all respects as the printer illustrated in FIGS. 1–5 and described above. In this embodiment, the deflection means comprises a plurality of pairs of parallel deflection electrodes 50 which extend obliquely with respect to the row of jet drop streams. Each of the pairs of deflection electrodes is positioned on opposite sides of a respective jet drop stream. Conductors 42 provide a means for providing a static drop deflecting potential across each pair of deflection electrodes, resulting in a drop deflecting field which is oblique with respect to the row of jet drop streams.

Drops enter the deflection field provided by deflection electrodes 50 generally in the position shown at 48*f.* Drops which are uncharged pass through the deflection field unaffected by the field and strike the print receiving medium at print positions generally below position 48*f.* Drops charged to an intermediate print charge level, however, are deflected parallel to the field of position 48*g.* Similarly, drops charged to a higher, catch charge level are deflected sufficiently parallel to the field such that they strike the catcher 46, as indicated at 48*h.* Thus, the embodiment of FIGS. 6 and 7 provides an extremely simple construction which permits printing with drops from each of a plurality of drop streams at print positions along a plurality of parallel print lines and selective catching of drops. No longitudinal deflection electrode 44 is required, as is the case with the embodiment of FIGS. 1–5 and, since the drop catcher is not utilized to provide a deflection field, the catcher 46 may, if desired, be formed of electrically non-conductive material.

It will be appreciated that, although only two print positions for each jet drop stream have been illustrated in FIGS. 5 and 6, printers embodying the present invention may be arranged to print any number of print positions with each jet drop stream. The only requirement is that the drop charging arrangement makes provision for charging the drops to a corresponding number of discrete charge levels.

While the forms of apparatus herein described constitute preferred embodiments of the invention, it is to be understood that the invention is not limited to these precise forms of apparatus, and that changes may be made therein without departing from the scope of the invention.

What is claimed is:

1. An ink jet printer for depositing ink drops along a plurality of parallel print lines on a moving print receiving medium, comprising:

print head means for generating a plurality of jet drop streams directed toward said print receiving medium, said streams being arranged in a row substantially perpendicular to the direction of movement of said print receiving medium, means for selectively charging drops in said jet drop streams to predetermined ones of a plurality of charge levels, deflection means for providing a plurality of static drop deflecting electrostatic fields with each of said jet drop streams passing through an associated one of said fields, each of said drop deflecting fields deflecting charged drops passing therethrough in a direction which is inclined with respect to said row of jet drop streams and with respect to the direction of movement of said print receiving medium, each drop in said jet drop streams being deflected by a distance dependent upon the charge carried by the drop, and drop catcher means, adjacent said row of drop streams and defining a drop catching surface extending substantially parallel thereto, for catching drops from each of said drop streams which are deflected sufficiently to strike said drop catching surface, whereby each of said jet drop streams selectively deposits drops along a plurality of print lines on said print receiving medium to form a print image thereon.

2. The ink jet printer of claim 1 in which said deflection means comprises:

a plurality of pairs of lateral deflection electrode means, each of said pairs positioned on opposite sides of a respective jet drop stream, for providing first static electrical deflection fields extending substantially parallel to said row of jet drop streams, and longitudinal deflection electrode means providing a second static electrical deflection field in a direction substantially perpendicular to said row of jet drop streams, whereby charged drops are deflected by said first static electrical deflection field in a direction parallel to said row of jet drop streams and are deflected thereafter by said second static electrical deflection field in a direction substantially perpendicular to said row of jet drop streams, such that the net deflection of each charged drop is inclined with respect to said row of jet drop streams and with respect to the direction of movement of said print receiving medium.

3. The ink jet printer of claim 1 in which said deflection means comprises:

a plurality of pairs of parallel deflection electrodes extending obliquely with respect to said row of jet drop streams, each of said pairs positioned on opposite sides of a respective jet drop stream, and means for providing a static drop deflecting potential across each pair of drop deflection electrodes.

4. A jet drop printer for selectively depositing drops along a plurality of parallel print lines on a moving print receiving medium, comprising:

print head means for generating a plurality of jet drop streams directed toward said moving print receiving medium, said streams arranged in a row substantially perpendicular to the direction of movement of said print receiving medium, drop charging electrode means, adjacent each of said plurality of jet drop streams, for selectively charging drops in each of said streams to one of a plurality of discrete charge levels.

a plurality of lateral deflection electrode means, each of said lateral deflection electrode means associated with a respective one of said jet drop streams, for providing first static electrical deflection fields through which drops in said jet drop streams pass after being selectively charged by said drop charging electrode means, said electrical fields extending in a direction such that charged drops passing therethrough are laterally deflected in a direction parallel to said row of jet drop streams by a distance related to the charge carried thereon, means for providing a second static electrical deflection field through which drops in said jet drop streams pass after passing through an associated one of said first static electrical deflection fields, said second static electrical deflection field extending parallel to the direction of movement of said print receiving medium, and drop catcher means, defining a drop catching surface extending substantially parallel to said row of jet drop streams, for catching drops deflected by said second static electrical deflection field sufficiently so as to strike said drop catching surface, whereby each jet drop stream selectively deposits drops along a plurality of adjacent print lines to produce a print image on said print receiving medium.

5. A multiple jet ink jet printer for depositing ink drops along parallel print lines on a moving print receiving medium, drops from each jet drop stream being deposited along a plurality of said print lines, comprising:

means for generating a plurality of jet drop streams directed at said print receiving medium, said streams being positioned in a row, means for selectively charging drops in each of said jet drop streams to one of a plurality of discrete electrical charge levels, one of said charge levels being a catch level associated with catching of drops so charged and each of the others of said charge levels being print levels associated with depositing of drops along respective ones of said plurality of print lines, drop catcher means, defining a drop catching surface extending substantially parallel to said row of jet drop streams, and deflection means for generating a plurality of parallel deflection fields, each of said jet drop streams passing through an associated one of said deflection fields, each drop receiving a net deflection directly related to the charge carried by the drop, said net deflection having a deflection component in a direction toward said drop catcher means and a deflection component parallel with said drop catching surface of said drop catcher means, whereby drops charged to said catch level are deflected to strike said drop catching surface of said drop catcher means and drops charged to one of said print levels are deflected to be deposited along the print lines associated therewith.

6. The ink jet printer of claim 5 in which said deflection means comprises:

a plurality of pairs of lateral deflection electrode means, each of said pairs positioned on opposite sides of a respective jet drop stream, for providing first static electrical deflection fields extending substantially parallel to said row of jet drop streams, and longitudinal deflection electrode means for providing a second static electrical deflection field in a direction substantially perpendicular to said row of jet drop streams, whereby charged drops are deflected by said first static electrical deflection field in a direction parallel to said row of jet drop streams and are deflected thereafter by said second static electrical deflection field in a direction substantially perpendicular to said row of jet drop streams, such that the net deflection of each charged drop is inclined with respect to said row of jet drop streams.

7. The ink jet printer of claim 5 in which said deflection means comprises:

a plurality of pairs of parallel deflection electrodes extending obliquely with respect to said row of jet drop streams, each of said pairs positioned on opposite sides of a respective jet drop stream, and means for providing a static drop deflecting potential across each pair of drop deflection electrodes.

* * * * *